(12) United States Patent
Bailey (10) Patent No.: US 7,032,469 B2
(45) Date of Patent: Apr. 25, 2006

(54) THREE AXES LINE-OF-SIGHT TRANSDUCER

(75) Inventor: Theodore B. Bailey, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/293,422

(22) Filed: Nov. 12, 2002

(65) Prior Publication Data

US 2004/0089083 A1    May 13, 2004

(51) Int. Cl.
*G01C 19/54*    (2006.01)
*G01B 11/26*    (2006.01)

(52) U.S. Cl. ............................ 74/5.6 A; 356/139.03
(58) Field of Classification Search ............. 74/5.6 A; 356/139.03; 250/222–231.18
See application file for complete search history.

(56) References Cited

U.S. PATENT DOCUMENTS

| | | | | |
|---|---|---|---|---|
| 2,959,060 A | * | 11/1960 | Kunz | .................. 74/5.6 A |
| 3,328,595 A | * | 6/1967 | Todd, Jr. | ................ 250/231.13 |
| 4,488,041 A | * | 12/1984 | Baudot | ................... 250/231.12 |
| 5,223,709 A | * | 6/1993 | Pettypiece, Jr. | .............. 250/229 |
| 6,444,976 B1 | * | 9/2002 | Ishikawa et al. | ............. 250/229 |
| 6,737,591 B1 | * | 5/2004 | Lapstun et al. | ........... 178/19.05 |

* cited by examiner

*Primary Examiner*—Thomas H. Tarcza
*Assistant Examiner*—Isam Alsomiri
(74) *Attorney, Agent, or Firm*—Thomas J. Finn; Leonard A. Alkov; Karl A. Vick (57) ABSTRACT

A system and method for measuring orientation of an object. In the illustrative embodiment, the object is a ball (42) in a ball and socket type pointing and stabilization system. The novel system (40) includes an encoded pattern (46) applied to a portion of the surface of the ball (42), a pattern reader (44) which reads the pattern (46) off the ball (42) and outputs data representative of the pattern (46), and a processor (48) which decodes the data into orientation information. In the preferred embodiment, the pattern reader (44) is an electro-optical sensor, and the encoded pattern (46) includes a grid of dots (52) arranged in a first predetermined number of dot code cycles (58) wherein each dot code cycle (58) includes a second predetermined number of dots. The processor (48) includes an algorithm (100) which computes pitch, yaw, and roll angles from the pattern reader data.

17 Claims, 11 Drawing Sheets

PRIOR ART

Fig. 1

PRIOR ART

THREE AXES LINE-OF-SIGHT TRANSDUCER

BACKGROUND OF THE INVENTION

1. Field of the Invention

The present invention relates to sensors. More specifically, the present invention relates to systems for measuring the relative position of a ball to a socket for any device using a ball and socket.

2. Description of the Related Art

The ball and socket type gimbal approach has been attractive for many years for pointing and stabilization systems (PSS) for seeker applications. The issue with this approach has been precise control of ball orientation. One of the three primary components in controlling the ball is accurate measurement of ball orientation.

The ball joint gimbal (BJG) employs current art for ball and socket PSS. The basic BJG configuration has a ball in a socket with the ball orientation controlled by four motors that pull on tendon cables attached to the ball. Optical encoders on the motors sense ball orientation by measuring tendon length in an indirect line-of-sight (LOS) measurement approach that restricts the control and stabilization approach.

The BJG has inherently attractive features for seeker applications. For applications with large acceleration requirements, the BJG offers large aperture access and good gun launch hardening characteristics due to the large contact area between the ball and the socket and simplicity in parts. The BJG, however, also has disadvantages that impede its development for small quick munitions. These issues include very complicated processing, ball actuation cable reliability, stabilization for higher frequency excitation, source of small motor/encoders of sufficient accuracy and an excessive time period after power-up for gimbal initialization before use.

The present implementation of the BJG employs remote stabilization by taking angular rate inputs from the inertial measurement unit (IMU) and very accurately measuring the ball orientation at a high data rate to calculate ball inertial position and position rates. This information is used to stabilize ball orientation and LOS. Unlike conventional gimbals, the BJG does not take advantage of a free-floating inner gimbal in which the inertia of the inner gimbal aids in stabilization. The BJG employs rigid coupling between the ball and housing through the actuation cables and motors. Part of this rigid coupling arises because the actuation cables are coiled around the capstans of the motors, creating a mechanical advantage between the motor's rotor and the ball. Small movement of the ball results in large movement of the rotor. Thus, the inertia of the motor's rotor is working against the inertia of the ball through the amplification of the mechanical advantage.

In operation, the orientation of the ball that represents a stabilized LOS for that instance in time is calculated from body rate, and relative ball position inputs, and the ball is driven to that orientation. If the orientation calculation is in error, due to cable stretching, untimely data or other inequities, the ball will be driven to an erroneous orientation causing LOS errors and jitter. Of course this is the case with any gimbal, but the ridged coupling between the ball and the motors prevents the integration or smoothing of high frequency errors by the gimbal's inertia. One result of this iniquity is that as the gimbal excitation increases in frequency, where changes in body rate are not over-sampled by the rate sensor, the error in the orientation calculation increases. The result is that the LOS stability decreases as the excitation increases in frequency which is the opposite of conventional gimbal characteristics.

The measurement of the ball position remotely, i.e. by measuring the actuation cable position, is a natural source for error and requires preflight initialization such that the system knows zero position of the encoders before operation. This calibration takes more time than is desirable in a seeker that must react very quickly. A better way of measuring ball orientation would be to measure it directly at the ball.

Hence, a need exists in the art for an improved system or method for measuring ball orientation in ball and socket type pointing and stabilization systems which is highly accurate, requires no preflight calibration, is small and simple in implementation and measures both axes at once.

SUMMARY OF THE INVENTION

The need in the art is addressed by the system and method for measuring orientation of an object of the present invention. In the illustrative embodiment, the present invention is a sensor that allows for continuous measurement of the orientation of a ball in a ball and socket type pointing and stabilization system. More generally, the invention may be used to measure the relative position of a ball to a socket for any device using a ball and socket. It may also be used to measure the relative position of the inner gimbal to the outer gimbal for a conventional gimbal configuration. The novel system includes an encoded pattern applied to a portion of the surface of the ball, a pattern reader which reads the pattern off the ball and outputs data representative of the pattern, and a processor which decodes the data into orientation information. In the preferred embodiment, the pattern reader is an electro-optical sensor, and the encoded pattern includes a grid of dots arranged in a first predetermined number of dot code cycles wherein each dot code cycle includes a second predetermined number of dots. A location code located within each dot code cycle identifies the dot code cycle. In the illustrative embodiment, the processor includes an algorithm which computes pitch, yaw, and roll angles from the pattern reader data.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which, the present invention would be of significant utility.

Figure 1:
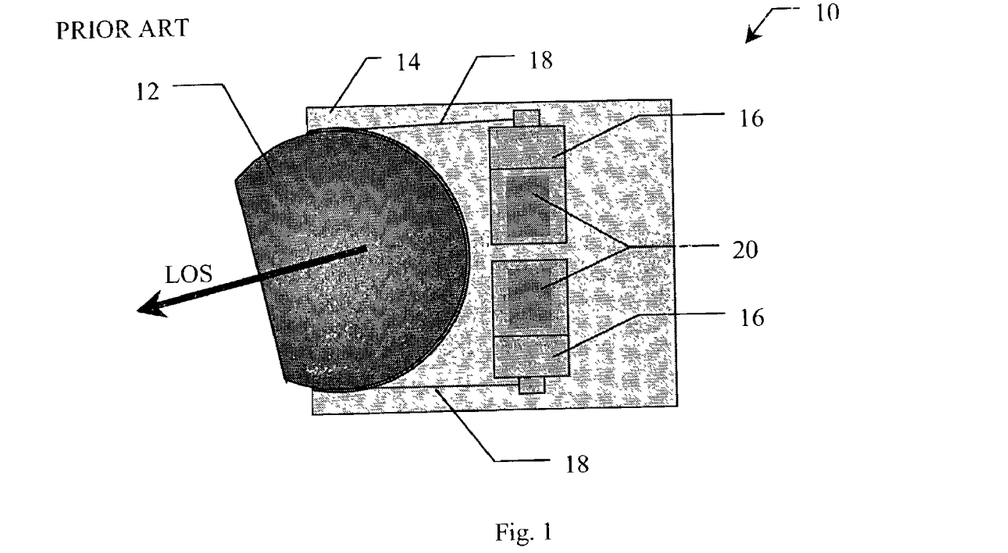
FIG. 1 is an illustration showing a basic BJG configuration in accordance with conventional teachings.
Figure 2:
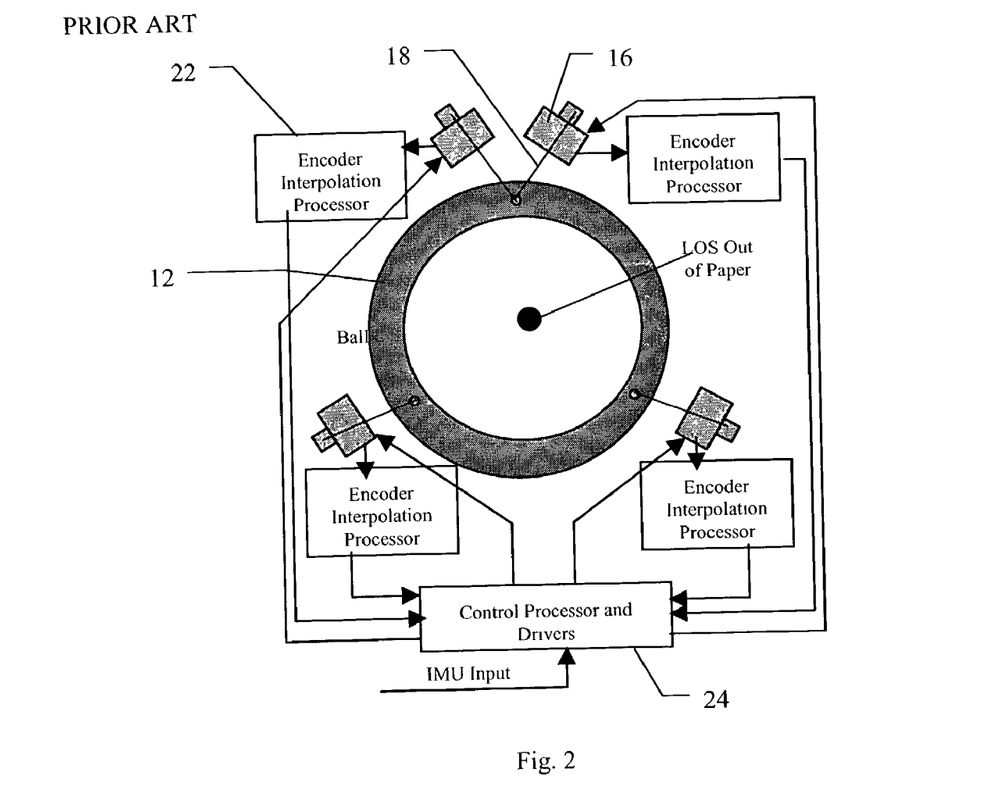
FIG. 2 is a block diagram of the BJG illustrating motor and processor positioning.

FIG. 1 is an illustration showing a basic BJG configuration 10 in accordance with conventional teachings. A ball 12 in a socket 14 has a ball orientation controlled by four motors 16 that pull on tendon cables 18 attached to the ball 12. Optical encoders 20 on the motors 16 sense ball orientation by measuring tendon length. To achieve the required line-of-sight (LOS) measurement accuracy with shaft optical encoders, the tendon cables 18 are wrapped around capstans on the motor encoder shaft. The mechanical advantage caused by the capstan winding eliminates the ability of the ball 12 to float freely in the socket 14 since it must overcome the magnified motor rotor inertia. The control and stabilization system then must overcome the inertia of the ball rather than the inertia aiding in stabilization as with conventional gimbals. As a result, a high speed sophisticated position type control approach is used. Also, for accuracy, each encoder requires a processor 22 to interpolate between the encoded positions. The encoder interpolation processors 22 are driven by a control processor 24. FIG. 2 is a block diagram of the BJG illustrating motor and processor positioning.

Secondly, since the optical encoders measure relative position rather than absolute position of the ball, the system must be initialized before each use to determine the location of the (0,0) position. This time consuming and tedious process limits its use for quick response systems.

Thirdly, because of the rigid coupling between the ball and motors of the BJG, the ball position must be measured at high accuracy and sample rate. The measurement of ball position remotely by measuring tendon length lends itself to error due to tendon stretching, improper capstan winding and other inadequacies. Measurement of ball position at the ball would be preferable.

Improvement in the gimbal performance can be expected if the mechanical advantage between the motor's rotor and the ball is removed and the inertia of the motor's rotor is reduced. One reason for the actuation cable to be wrapped around the capstan of the motor is to increase the accuracy of position sensing. The ball position is sensed by encoders within the motor. The mechanical advantage creates large movement of the rotor where position is sensed, for very small movement of the cable and ball resulting in more accurate measurement of the cable and ball position. Of course accurate position measurement is imperative for a remotely stabilized gimbal. However, if the mechanical advantage is removed, and the drag due to the rotor inertia is removed, lowered or made such that it follows the gimbal as in conventional gimbals, processing requirements can be expected to decrease and performance will improve. This invention presents an approach that could create these results.

The present invention is a sensor that allows for continuous measurement of the pointing direction of the ball of a ball and socket type pointing and stabilization system. The primary area of improvement is in a better method for determining ball orientation (i.e. line-of sight of the seeker). The sensor described herein allows removal of the optical encoders from the four actuation motors and the encoder signal processing required at each encoder for the present BJG configuration. It would also remove the time consuming process of initialization (that allows the BJG to find zero LOS) of the gimbal and allow more conventional and simple torque motors to be used for ball actuation through the actuation cables. The freedom to remove the capstans and change the motors to direct drive motors can allow a free-floating ball for an overall simpler design. The ability to measure LOS at the ball allows more conventional gimbal control algorithms to be used that require less processing. The innovation discussed herein measures ball orientation in pitch, yaw and roll (FIG. 3) and is referred to as a three axes LOS transducer (TALT) for ball and socket type seeker PSS applications.

Figure 3:
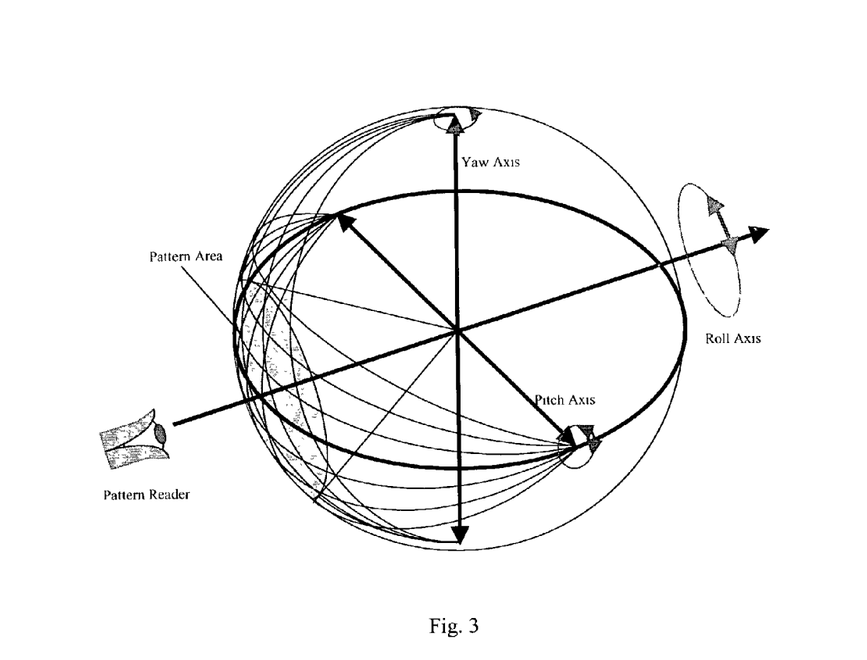
FIG. 3 is an illustration showing the three axes of motion pitch, yaw, and roll which can be measured by the present invention.

FIG. 3 is an illustration showing the three axes of motion pitch, yaw, and roll which can be measured by the present invention. This ability to measure pitch, yaw and roll in a gimbal allows an added degree of freedom for seeker applications. With the notion that if it can be measured, it can be controlled, seekers may be able to stabilize the LOS not only in pitch and yaw but also LOS roll. Presently roll control is done either by a separate roll axis, by electronic means, or by stringent roll control requirements on the flight control system and autopilot. Of course the extra roll axis is space consuming and costly, electronic roll control does not prevent image smear caused by image motion during sensor integration, and more stringent flight control requirements increase overall unit cost.

Figure 4:
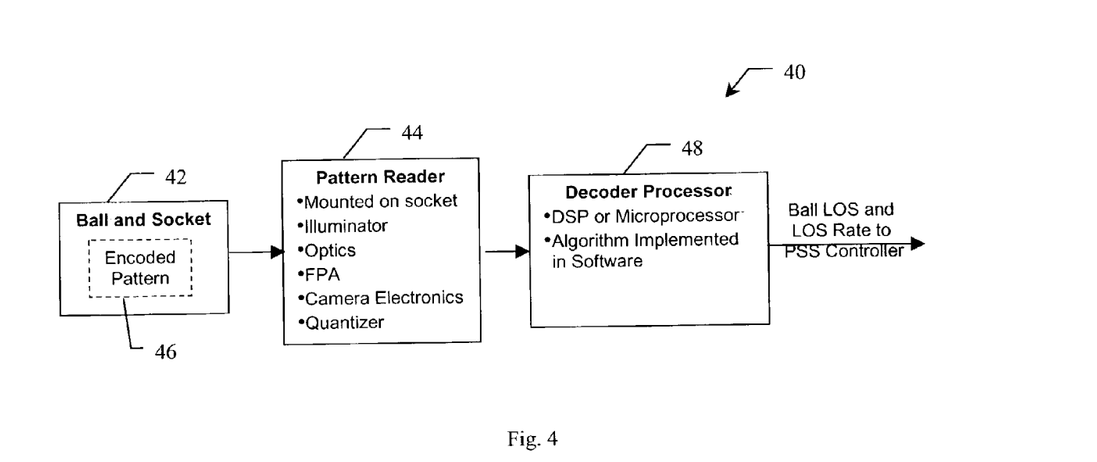
FIG. 4 is a block diagram of the measurement approach of the present invention.

FIG. 4 is a block diagram of the measurement approach 40 of the present invention. It uses an imaging electro-optical (EO) sensor 44 and an encoded pattern 46 etched or otherwise deposited onto the surface of the ball 42 that allows accurate measurement of ball orientation and gimbal LOS in three axes. In a preferred embodiment, the imaging detector 44 could be a visible FPA such as a CCD TV detector of (256×256) pixels or more. This type of detector is readily available at low cost. The pattern 46 could be a high-resolution black and white spot pattern deposited onto the surface of the ball 42. The pattern 46 could be deposited onto the ball surface by etching through a photoresist. The exposure of the photoresist layer can be by writing directly onto the surface with a laser or by exposure through a negative master pattern for contact exposure. The latter approach could allow low cost high volume pattern deposition.

In an alternative embodiment, the pattern 46 could be etched onto the socket with the reader 44 located on the ball.

The decoder processor 48 is a digital signal processor (DSP) or a part of the system processor of the seeker that would take the digital video output from the pattern reader 44, extract the orientation location code and thus, the ball orientation. From the ball orientation the LOS and LOS rate would be calculated and output to the gimbal control processor.

Figure 5A:
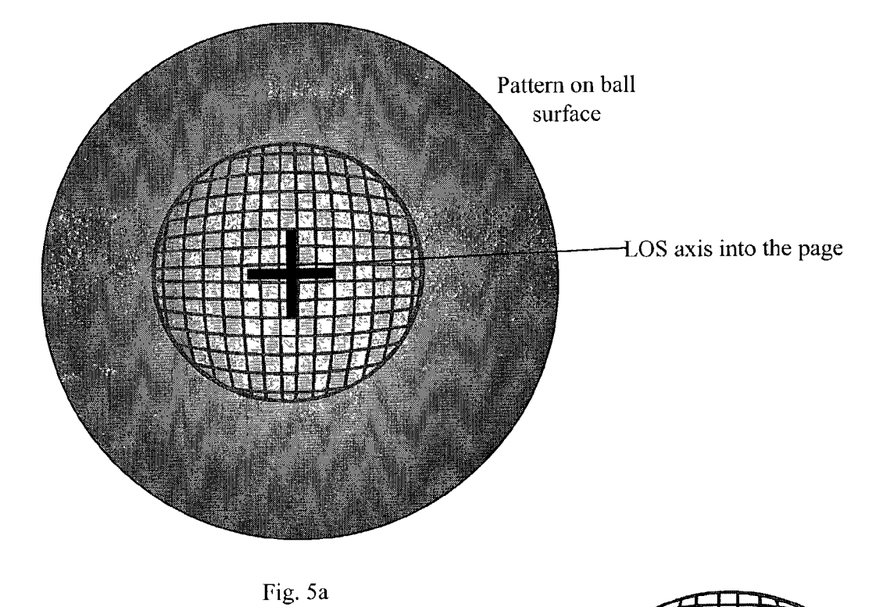
FIG. 5*a* shows a grid pattern of encoded orientation information on the ball surface.
Figure 5B:
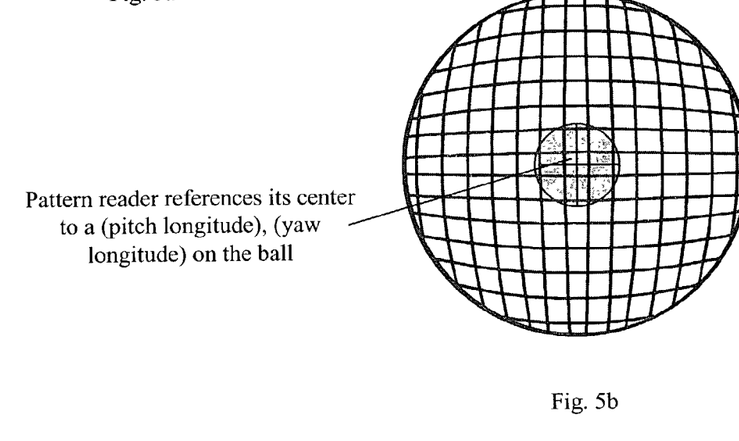
FIG. 5*b* shows a grid pattern viewed by the pattern reader.

A grid pattern as shown in FIGS. 5a and 5b may be deposited on the surface of the sphere into which coded location indicators can be deposited. FIG. 5a shows the grid pattern of encoded orientation information on the ball surface. The pattern is arranged along equators of the sphere creating lines of latitude about the pitch and yaw axes. The grid lines themselves are not important and may or may not show up in the final pattern. The purpose of the grid is to provide locations for a coded pattern to be discussed later. FIG. 5b shows the grid pattern viewed by the pattern reader. The pattern reader references its center to a pitch longitude and yaw longitude on the ball. Thus, the designated portion of the sphere has been broken into sections of (x) degrees apart. Assuming that the LOS axis pass through the center of the pattern, the ball is contained such that its center cannot move, and the center of the pattern reader (mounted to the socket) can be referenced to a specific location within the pattern, then the orientation of the ball in pitch and yaw can be determined.

Figure 6:
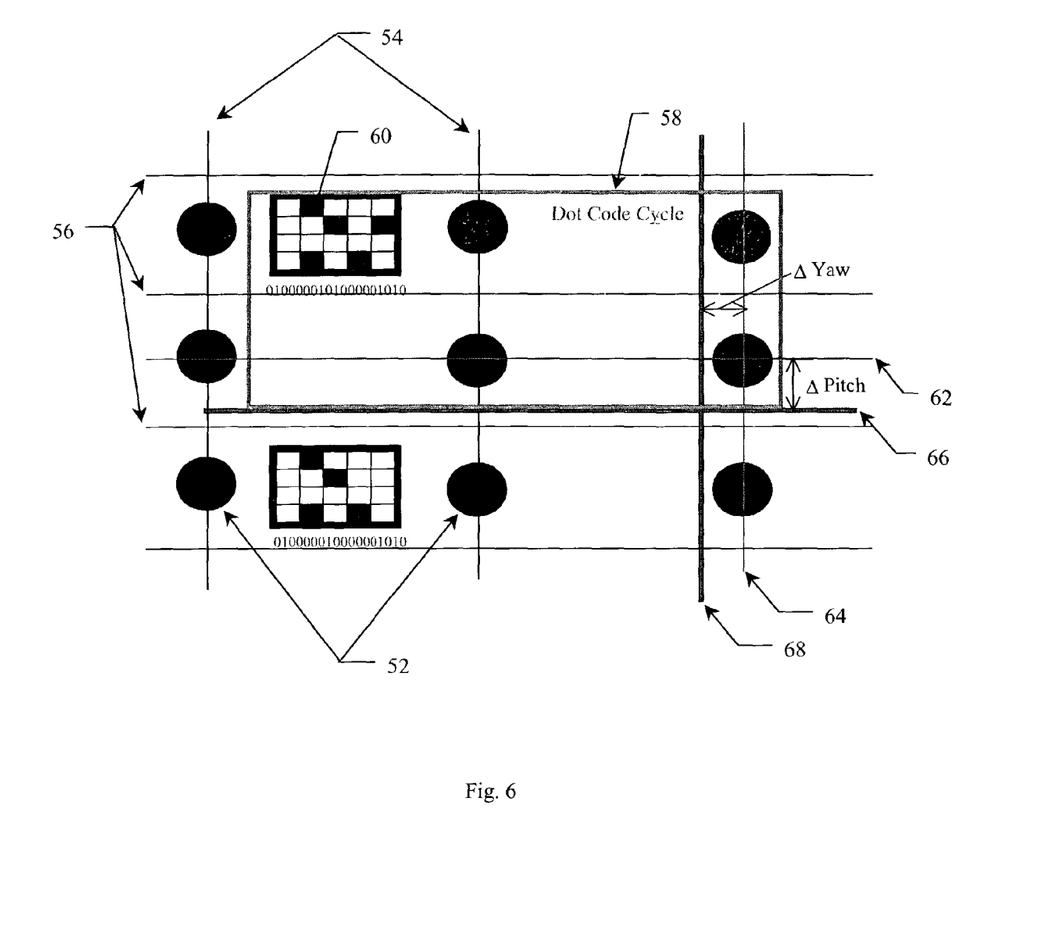
FIG. 6 is an illustration showing an illustrative example of a pattern configuration with the pattern imaged onto the pattern reader detector.

FIG. 6 is an illustration showing an illustrative example of a pattern configuration with the pattern imaged onto the pattern reader detector. Dots 52 are placed in a grid pattern along lines of yaw longitude 54 and lines of pitch longitude 56. In the illustrative embodiment, four dots form a dot cycle 58. Note that the number of dots in a dot cycle can be as few as one or as many as the resolution of the FPA will allow. A 4×5 matrix of dark and light squares (1s and 0s) forms a location code 60 that identifies the location of the dot cycle 58. This provides 1,000,000 locations and could be more or less. In the preferred embodiment, locations are at the center of the dots in the dot cycle and the pattern in the dot cycle identifies the dot set being viewed. The cycle codes are numbered in a binary or other number code suitable for the application. The final resolution is determined by how accurately the dot centers (62, 64) can be measured relative to the axes of the reader (66, 68). With this type of pattern, the pattern reader has no ambiguity about the dot (ball orientation) being addressed which allows LOS to be read out immediately without in the field calibration or initialization.

In operation the dot closest to the center of the pattern reader axes (66, 68) is identified and referenced at sub dot resolution creating the dot location (+/−Δ pitch, +/−Δ yaw). Hence, the pitch and yaw angles of the LOS can be determined to the accuracy of the center location of the dots.

The grid pattern is arranged along lines of longitude about the pitch and yaw axes. When viewed at the pattern reader, the pattern is parallel to the axis of the pattern reader that measures pitch and likewise for the yaw axis. However, if the ball has experienced roll i.e. rotation of the plane defined by the pitch yaw axes, the lines of longitude make an angle with the pattern reader axis equal to the amount of roll. Thus the pattern reader allows measurement of ball orientation in all three axes (pitch, yaw, & roll) of motion.

Figure 7:
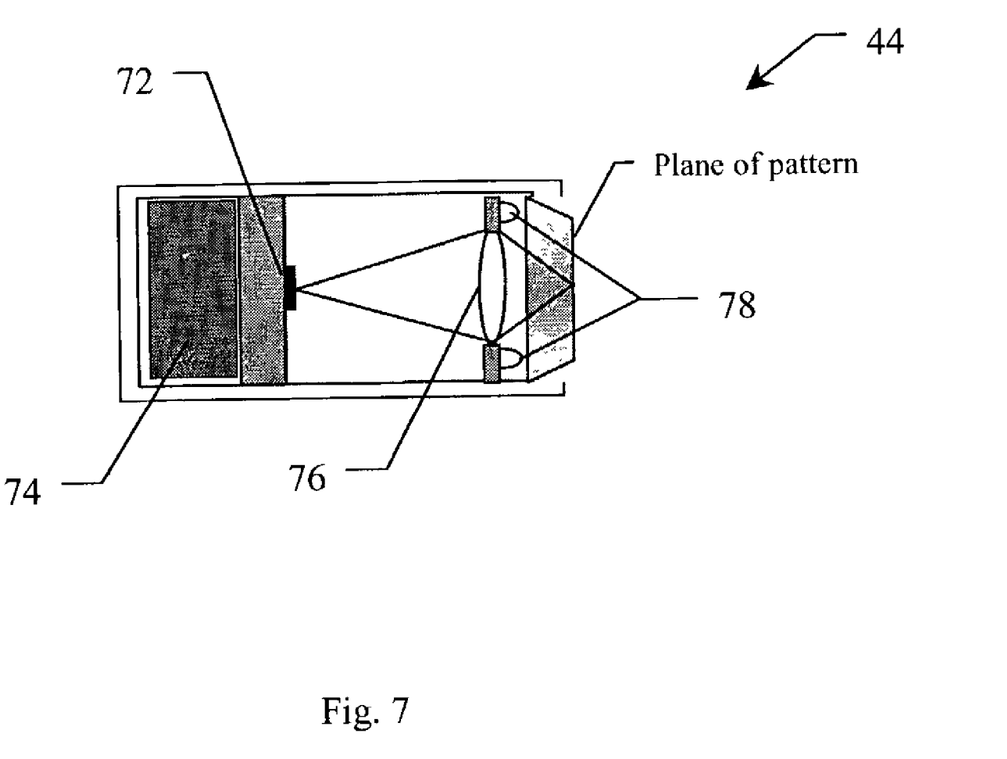
FIG. 7 is an illustration of the pattern reader of the illustrative embodiment.

In the preferred embodiment, the pattern reader 44 is an imaging electro-optical device using a staring focal plane array (FPA) of detectors operating in the visible spectrum as the sensor. FIG. 7 is an illustration of the pattern reader 44 of the illustrative embodiment. The pattern is imaged onto an FPA 72 controlled by control electronics 74 by a lens 76 that creates sufficient magnification to allow accurate pattern measurement. With the pattern imaged onto the FPA 72 by the pattern reader 44, the exact geometry of the staring FPA is used as a measurement reference. The pattern is illuminated by light sources 78 in the pattern reader 44. To reduce image smear due to ball motion when the pattern is being read, these sources may be strobed, the integration period of the FPA may be made short, or a combination of the two may be used. The size of the image of a dot on the FPA should be at least 2×2 pixels with 3×3 more preferable for highly accurate dot position measurement. This is necessary since the error in determining the center of the spot is related to the number of pixels contained within the spot.

The decoder processor 48 includes an algorithm to extract the pitch, yaw and roll angles from the pattern reader video. The decoder processor 48 first inputs a digital image from the FPA camera control electronics 74 and searches the image for general dot and location code locations. It then determines the dot closest to the FPA center and locates its position within the location code and its center relative to the FPA axes. Next it reads the location code associated with that dot and adjusts for the pitch and yaw distance from the dot to the center of the FPA. Knowing the location code of the dot, the dot position in the dot cycle and the position of the dot relative to the center of the FPA, the pitch and yaw orientation of the ball can be calculated.

To determine the roll angle, the algorithm links the centers of the dots being careful to consider the spacing to identify either the pitch or the yaw axes. It then calculates the angle between the axis of the ball and the corresponding axis of the FPA. With this information, the orientation of the plane defined by the pitch and yaw axes is determined relative to the axes of the FPA. Note that some compensation may be necessary for reasonably large off-axis roll measurements, but since the position of the ball is known to high accuracy in pitch and yaw, this is a geometry adjustment.

Figure 8:
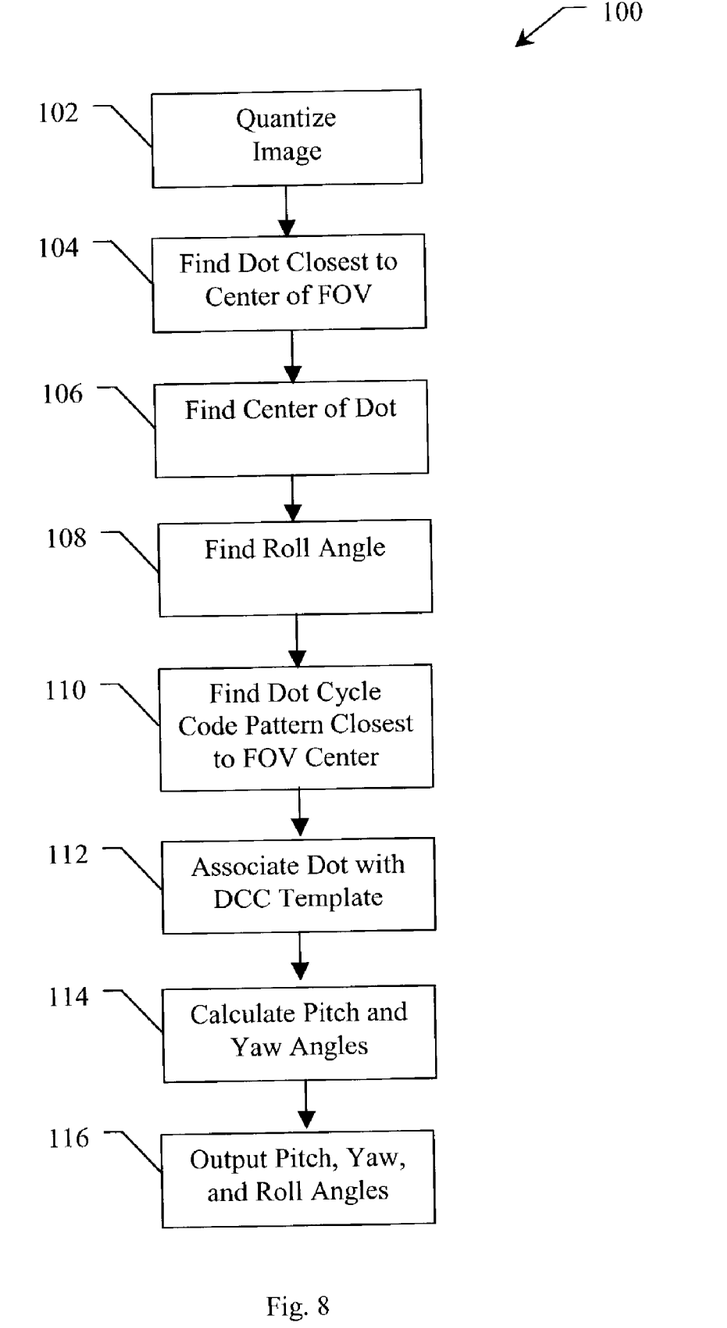
FIG. 8 is a flow chart of an algorithm to extract the pitch, yaw and roll-angles from the pattern reader video designed in accordance with the teachings of the present invention.
Figure 9A:
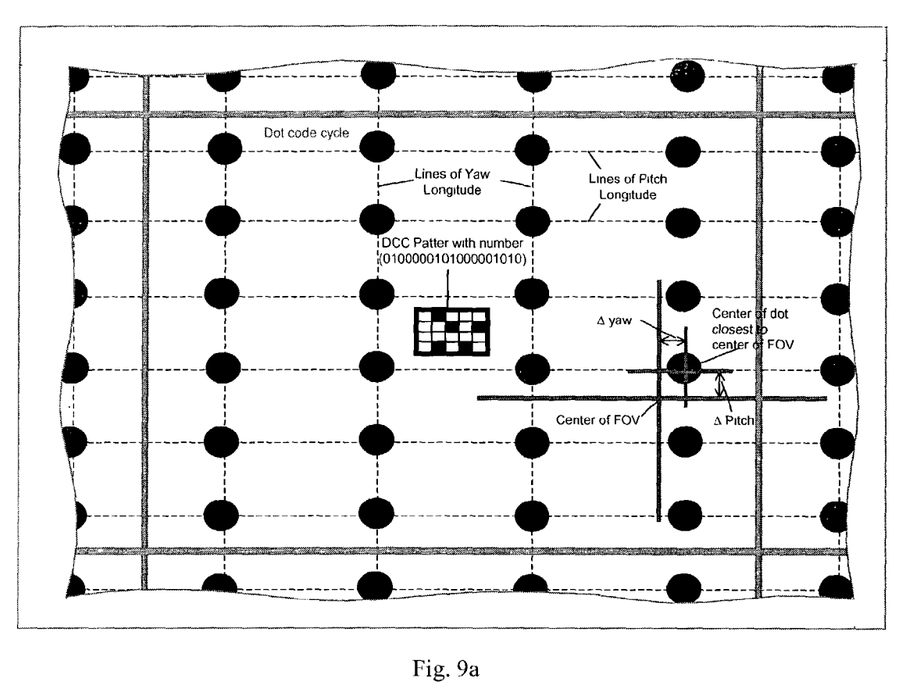
FIG. 9*a* is an illustration showing an example pattern used in the algorithm of FIG. 8.

FIG. 8 is a flow chart of an example algorithm 100 to extract the pitch, yaw and roll angles from the pattern reader video designed in accordance with the teachings of the present invention. Many variations of this algorithm and pattern configuration may be created to effectively read the coded pattern of the TALT and determine the orientation of the ball in a ball and socket type PSS or other applications requiring accurate ball position measurement. The algorithm discussed herein assumes that the pattern consists of dot code cycles (DCC) that are symmetrical about the center lines with the DCC pattern in the center of the cycle as shown in FIG. 9. FIG. 9 is an illustration showing an example pattern used in the algorithm of FIG. 8. The pattern of FIG. 9 is typical of patterns that are compatible with the algorithm that follows. Note that the number of dots in the DCC can be as little as one or as many as the resolution of the FPA will allow.

The first step 102 of the algorithm is to quantize the signal from the FPA camera control electronics 74. The TALT pattern is made up of areas that are either high in reflectance or low in reflectance. The analog output of the FPA then is either high or low. To convert this to a digital format, the analog signal is put through a voltage comparator that outputs one (5 volts) or zero (0 volts) depending on whether the pixel is above or below a threshold. Of course this can be accomplished in other ways such as an analog to digital converter (ADC) and a digital threshold but the comparator is simpler. The video is thus quantized to form a two bit digital output. The digital output is input into the memory of a computer or digital signal processor (DSP).

Next at step 104, it searches for the dot closest to the center of the field of view (FOV). One way to accomplish this is by the following steps:

Window the data to that near the FOV center.
    Create a file of exceedences.
    Find the exceedence nearest the FOV center
    Find the dot nearest the FOV center:
        Identify as dot or code (this may be done by segmenting to identify a dot about that exceedence or by applying a dot area template).
            If it is not a dot, designate it as code pattern, note and find the next closest dot.

Next at step 106, determine the center of the dot nearest to the FOV center. Many algorithms exist which can accomplish this. One way is to segment the edge of dot, curve fit it to a template dot circle, and then extract the center location from the template dot circle.

Then at step 108, find the roll angle. One way to determine the roll angle is by the following steps:

Find the center of the closest dot in yaw direction of the dot code cycle (DCC).
    Locate the exceedence at a distance equal to one dot spacing (center to edge) in yaw direction. Two will be found. Dot spacing can be made such that the distance from the center of a dot to its nearest neighbors edge in the yaw direction is unique.
    Identify each as dot or code pattern.
    If it is a code pattern, note and find the dot at the same distance. If it is a dot, find the dot center.
    Establish an equation of the line between the centers of these two dots (this is an estimate of a line of longitude).
    Find the two dots on this line nearest the edge of field of view.
    Find the centers of these dots.
    Using theses four dot centers, calculate the best fit straight line that passes through their centers (this gives a more accurate estimate of the line of longitude).
    Calculate the angle between this line and the field of view horizontal. This angle is the roll angle.

Next at step 110, locate the dot code cycle pattern nearest the FOV center. First check notes to determine if the DCC pattern has already been found. If not, search exceedences near the center of the FOV ignoring exceedences associated with dots already found in earlier steps. When an exceedence is found, segment or apply a template to determine if it is a dot. If it is a dot, identify all exceedences within it and eliminate them from the search. Continue to search until the DCC pattern is found.

At step 112, associate the dot with the DCC template. Rotate the DCC template in accordance with the roll angle (coordinates transform in angle) and apply the template to the image exceedences aligning the template with the DCC pattern. Identify the dot closest to the center of the FOV with DCC noting its position (i.e. row and column) within the DCC. By associating the dot nearest to the FOV center with the DCC template, the position of the dot within the DCC is found.

Figure 9B:
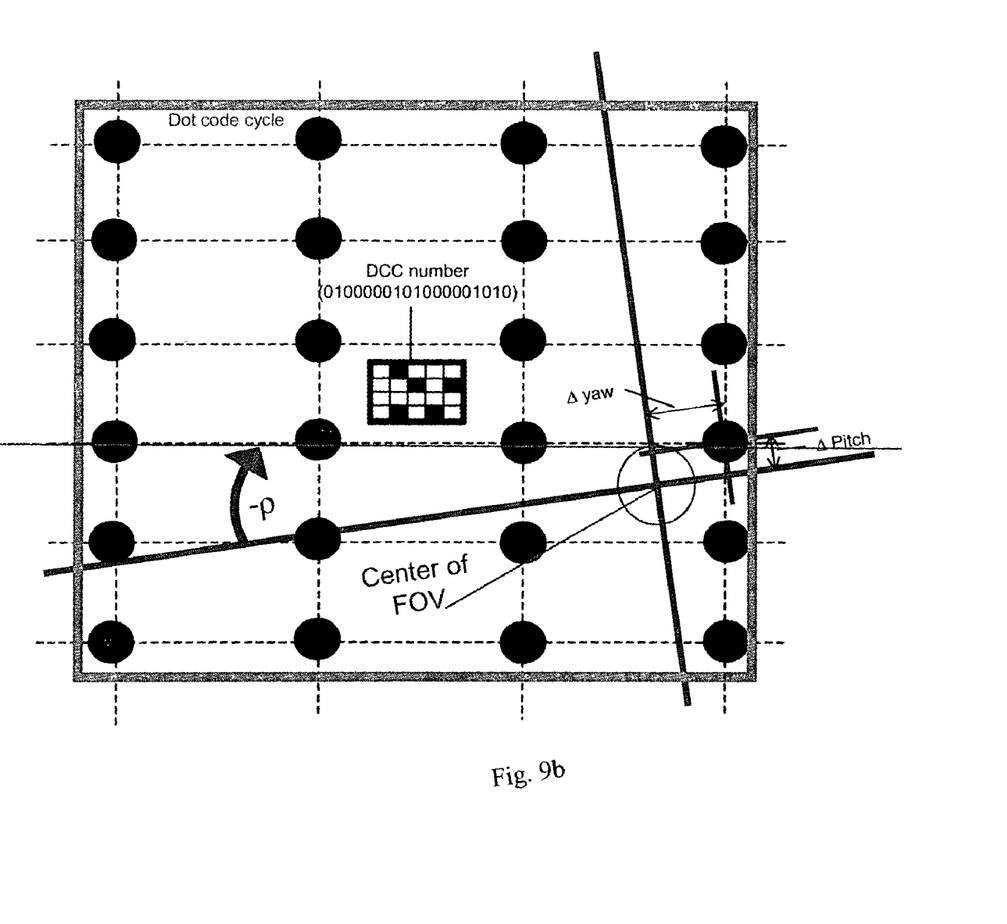
FIG. 9b is an illustration of a dot code cycle with a roll angle imaged onto the FPA.

At step 114, calculate the pitch and yaw angles. Pitch and yaw are calculated by determining the point within the DCC to which the center of the FOV aligns. This is done by first determining which dot within the DCC is closest to the center of the FOV. Note that it is not necessary for the designated dot to be the closest to the center of the FOV for the algorithm to perform. The dot closest to the center of the FOV is chosen to reduce the search space. The distances $\Delta$ pitch and $\Delta$ yaw are determined by measuring these distances in FPA space. Then the point in DCC space that aligns with the center of the FOV in DCC space is determined by performing a coordinates rotation about the designated dot equal but opposite in sign to the roll angle $\rho$ and translating a distance of $\Delta$ pitch and $\Delta$ yaw (see FIG. 9b). FIG. 9b is an illustration of a dot code cycle with a roll angle imaged onto the FPA.

Figure 9C:
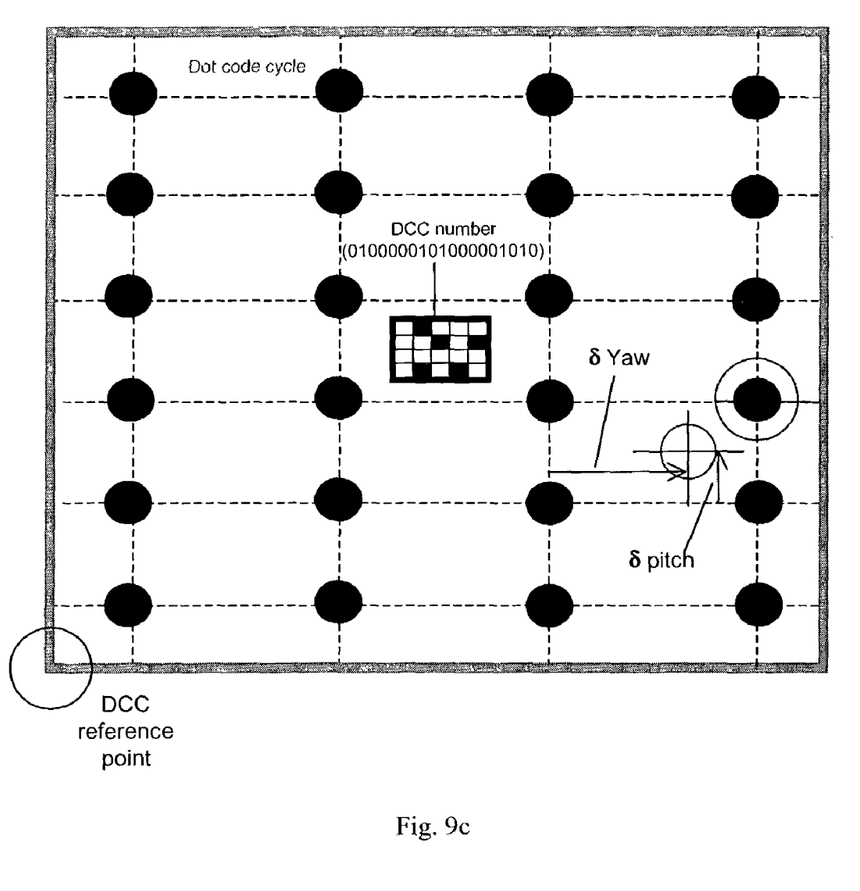
FIG. 9c is an illustration showing the layout of the final calculation of pitch and yaw angles.

Each DCC is identical to all others except for the code number which is unique. Pitch and yaw angles are referenced to the lower left corner of the DCC. If the dot chosen as closest to the center of the FOV in FIG. 9b is determined by association in column C and row R of the DCC, then the pitch and yaw angles are given by:

$$\text{Pitch Angle} = \text{PACODE} + (C-0.5)(\text{pitch spacing}) + \delta \text{ pitch} \quad [1]$$

$$\text{Yaw Angle} = \text{YACODE} + (R-0.5)(\text{yaw spacing}) + \delta \text{ yaw} \quad [2]$$

where PACODE and YACODE are the pitch and yaw associated with the DCC in question, C and R are the column and row number of the designated dot within the DCC, and $\delta$ pitch and $\delta$ yaw are the distances from the center of the designated dot to the center of the FOV (see FIG. 9c). FIG. 9c is an illustration showing the layout of the final calculation of pitch and yaw angles.

Finally at step 116, the pitch, yaw, and roll angles are output to the gimbal control.

Figure 10:
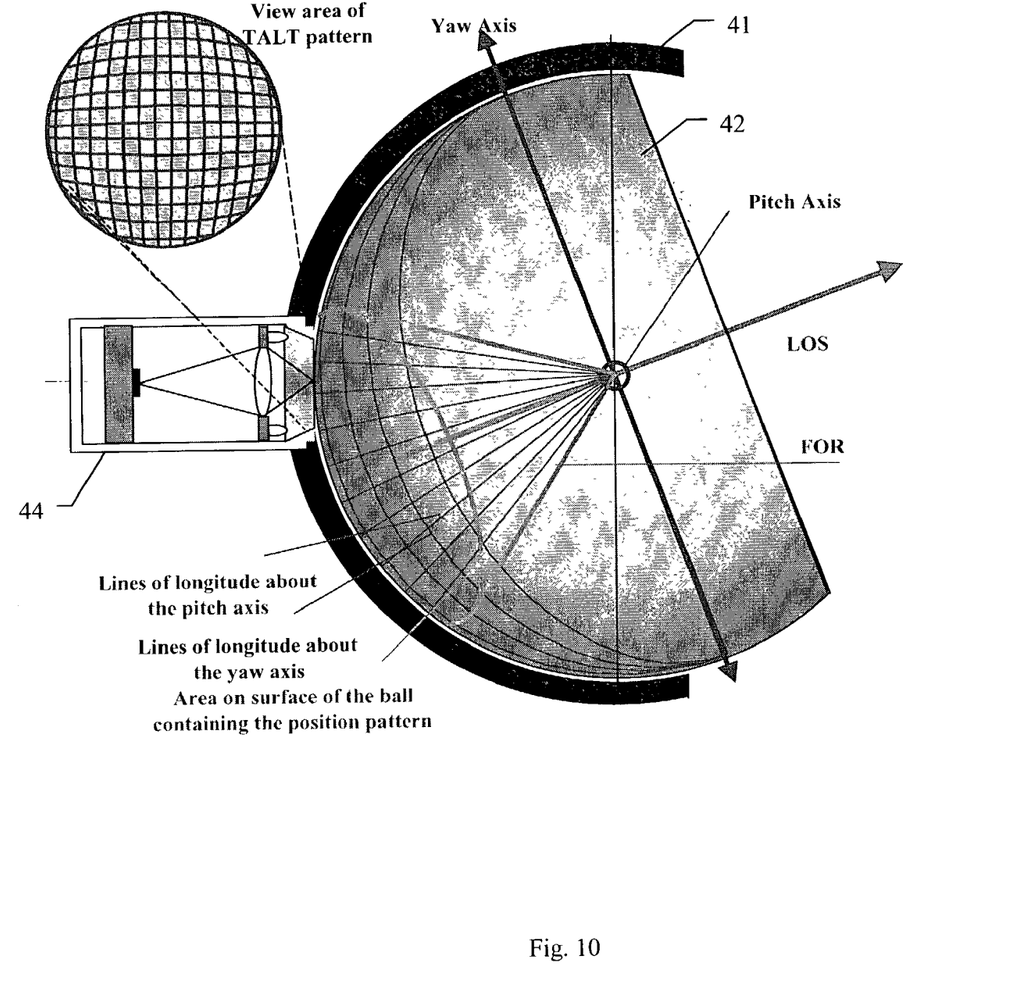
FIG. 10 is a diagram of an illustrative embodiment of the TALT in a ball and socket type PSS configuration designed in accordance with the teachings of the present invention.

FIG. 10 is an illustration of an illustrative embodiment of the TALT in a ball and socket type PSS configuration designed in accordance with the teachings of the present invention. This configuration shows the preferred (from a processing standpoint) positioning of the TALT cantered at the (0,0) LOS position. The TALT may be positioned anywhere on the socket 41 for mechanical convenience, but for positions other than the (0,0) position, a coordinates transformation is required. Low friction containment of the ball 42 within the socket 41 may be obtained in a number of ways. The prior art BJG employs an air bearing between the ball and socket surfaces. Other approaches may be to float the ball 42 with repelling magnetic surfaces or to float the ball 42 on an array of spring-loaded ball bearings mounted in the socket 41.

Figure 11A:
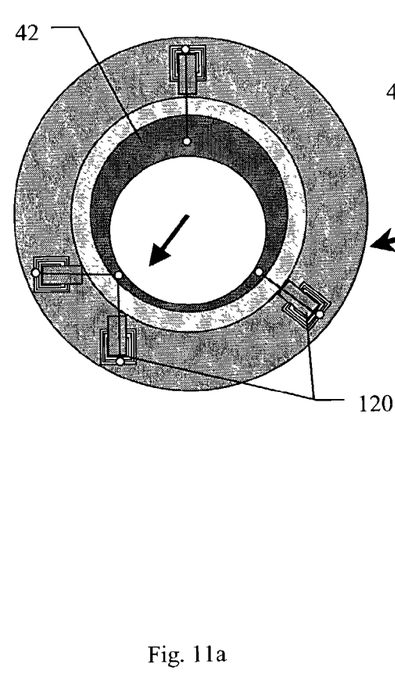
FIG. 11a is a top view of a diagram showing how the TALT and ball and socket might be arranged with low inertia voice coil type actuation motors and a gimbal controller.
Figure 11B:
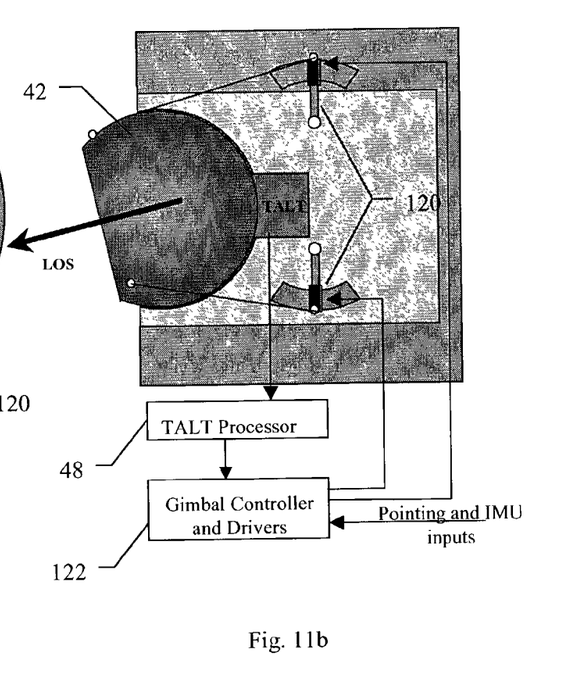
FIG. 11b shows a side view of a diagram showing how the TALT and ball and socket might be arranged with low inertia voice coil type actuation motors and a gimbal controller.

FIG. 11 is a diagram showing how the TALT and ball and socket might be arranged with low inertia voice coil type actuation motors and a gimbal controller. FIG. 11a shows a top view and FIG. 11b shows a side view. Voice coil type segmented torque motors 120 are attached to the ball 42 and controlled by a gimbal controller 122 which obtains ball orientation information from the TALT processor 48.

The combination of the pattern properly installed on the ball and the pattern reader with its associated processor, algorithms and implementing software make up a Three Axes LOS Transducer (TALT) capable of measuring ball orientation in pitch, yaw and roll. This device can allow a simple ball and socket PSS arrangement to be conceived with application to seekers for missiles and precision guided projectiles alike.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for measuring orientation of an object comprising:

an encoded pattern applied to a portion of the surface of said object, said pattern including a grid of dots, said dots being arranged in a first predetermined number of dot code cycles, said pattern including means for determining each dot code cycle, said means for determining including a location code disposed within each dot code cycle;

first means for reading said pattern and outputting data representative of said pattern; and second means for decoding data from said first means into orientation information.

2. The invention of claim 1 wherein said object is a ball.

3. The invention of claim 1 wherein said object is a socket and said first means is located on a ball disposed within said socket.

4. The invention of claim 1 wherein said dots are arranged along lines of longitude about the pitch and yaw axes.

5. The invention of claim 1 wherein each dot code cycle includes a second predetermined number of dots.

6. The invention of claim 1 wherein said location code is binary.

7. The invention of claim 1 wherein said location code is a matrix of dark and light squares.

8. The invention of claim 1 wherein said pattern is deposited onto the object surface by etching through a photoresist.

9. The invention of claim 1 wherein said first means includes an electro-optical sensor.

10. The invention of claim 9 wherein said sensor is a staring focal plane array of detectors.

11. The invention of claim 9 wherein said sensor operates in the visible spectrum.

12. The invention of claim 9 wherein said first means further includes means for illuminating said pattern.

13. The invention of claim 1 wherein said second means includes a processor running an algorithm to extract pitch and yaw from the data from said first means.

14. The invention of claim 13 wherein said algorithm includes the steps of:

finding the dot closest to the center of the field of view;
finding the center of said dot;
finding the location code associated with said dot;
finding the position of said dot within its dot code cycle; and
computing pitch and yaw angles from the location code of the dot, the dot position in the dot cycle, and the center of the dot.

15. The invention of claim 13 wherein said algorithm also extracts a roll angle from the data from said first means.

16. The invention of claim 15 wherein said roll angle is determined by linking the centers of the dots to identify either the pitch or the yaw axis, and calculating the angle between this axis and the corresponding axis of the sensor.

17. A method for measuring orientation of an object including the steps of:

depositing an encoded pattern on a portion of the surface of said object, said pattern including a grid of dots, said dots being arranged in a first predetermined number of dot code cycles, said pattern including means for determining each dot code cycle, said means for determining including a location code disposed within each dot code cycle;

reading said pattern and outputting data representative of said pattern; and decoding said data into orientation information.

* * * * *